UNITED STATES PATENT OFFICE.

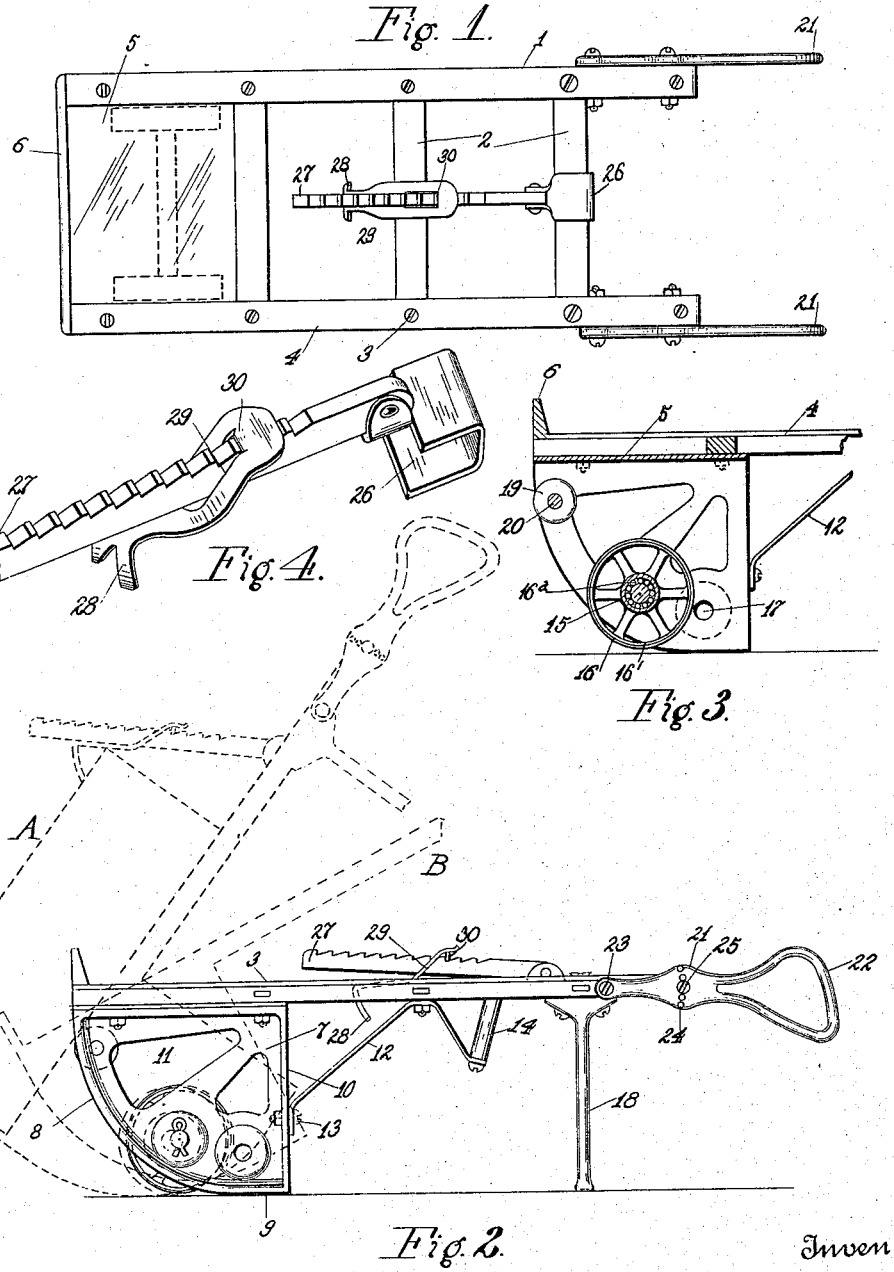

CURTIS S. CALHOUN, OF DECATUR, ILLINOIS.

HAND-TRUCK.

1,170,876.　　　　Specification of Letters Patent.　　Patented Feb. 8, 1916.

Application filed February 27, 1915. Serial No. 10,935.

*To all whom it may concern:*

Be it known that I, CURTIS S. CALHOUN, a citizen of the United States of America, residing at Decature, in the county of Macon and State of Illinois, have invented certain new and useful Improvements in Hand-Trucks, of which the following is a specification.

The present invention relates to improvements in hand trucks, and is designed particularly for the purpose of improving devices of this character in several particulars, in order to facilitate the handling of loads and especially heavy articles such as pianos, safes, dressers, etc.

The primary object of the invention is to provide a hand truck having fixed means thereon to facilitate in loading or unloading articles on to the truck, and to provide for a high or low gear in connection with the truck, and to improve the construction of the handles, and their relation with the hand truck itself.

The invention consists in certain novel combinations and arrangements of parts as will hereinafter be more fully pointed out and claimed.

In the accompanying drawings I have illustrated one complete example of the physical embodiment of my invention constructed according to the best mode I have so far devised for the practical application of the principles of the invention.

Figure 1 is a plan view of a truck embodying the novel features of my invention. Fig. 2 is a side elevation of the truck resting upon the ground or floor. Fig. 3 is a sectional view taken at the front of the truck. Fig. 4 is a perspective view of a device used in connection with the truck for holding an article thereon.

In the preferred embodiment of my invention, as illustrated in the drawings, I have shown a hand truck frame of standard variety converted for use with the novel features of my invention, and it will be understood, of course, that the invention is applicable for use with standard truck frames, or with specially constructed truck frames.

The truck frame illustrated in the drawing comprises a pair of side bars 1—1, and several cross bars as 2—2, which are secured by bolts 3 having their heads countersunk in the usual metallic strip 4 placed upon the top of the side bars 1. At the front of the truck a plate 5 forms a platform between the side bars and cross bar, and the usual ledge or retaining flange 6 is provided at the front end of the truck and extends transversely across the frame.

At each side of the front end of the frame I provide a quadrant shaped segmental member or runner 7 which forms a head with a curved nose 8, and a heel 9. These heads are preferably made of gray malleable iron and formed with flanges 10 and 11. By means of the flanges 11 the bolts 3 secure the heads to the side bars 1, and to the flanges 10 the braces are attached by bolts 13. These braces extend upwardly to the side bars 1, and are bolted thereto, and then the ends of the braces are extended downwardly and attached to the pair of supplemental handles 14, which are also secured to the side bars 1.

Between the two heads 7 a spindle 15 is supported and extends transversely of the truck, and this spindle supports a pair of rollers or wheels 16 upon which the truck may be moved about from place to place. These rollers 16 provided with rubber treads 16′ and ball bearings 16$^a$, are adapted to be located in two different positions in the heads. In the drawings I have illustrated the rollers in position for low gear work of the truck, and when it is desired to work the truck at a high gear for conveying heavy articles, such as pianos, the spindle with its rollers is moved to the rear of the truck, and supported in the holes 17 in the heads 7. In this position, at high gear, the truck will rest upon the rollers at the front, and at the rear will be supported in the usual legs 18, one at each side of the truck. When the low gear position of the wheels is used, the truck rests solidly upon the heel 9 and the leg 18, as shown in Fig. 2.

At the extreme front of the truck and above the rollers 16, I provide an additional pair of rollers as 19, journaled on the spindle 20, supported in the heads 7 transversely of the truck, and these supplemental rollers, as will be seen in Figs. 3 and 4, have their peripheries projecting slightly beyond the surface of the nose 8 of the head 7. These supplemental rollers are especially useful when the operator is manipulating the truck in order to get the ledge 6 under the box or other light article, and it will readily be seen that the truck will roll on these wheels or rollers as it is pushed into position.

At the rear end of the side bars, I provide a pair of adjustable handles as 21—21. These handles are preferably of wrought iron, and provided with a hand grasp 22, and are pivoted by a bolt 23 each to the outside of its side bar 1. Each handle is provided with a series of openings 24 arranged in an arc of a circle with the pivot 23 as a center, and the bolt or set screw 25 is adapted to secure the handle 23 in adjusted position by utilizing one of these openings 24. Thus, with the bolt 25 removed, the handle may be turned upon the bolt 23 as a pivot to adjust the hand grasp 22 either above or below the side bar 1, and then the set screw or bolt 25 may be used to secure the handle rigidly to the side bar. This adjustable handle especially adapts the hand truck for manipulation by different sized men, as it will readily be seen that the handle may be turned down in Fig. 2, to adapt it to a short man, and may remain either in its present position or be turned up to adapt it for a taller man.

In connection with the truck, I have illustrated a device which is especially applicable for holding articles while loading or unloading the truck. This device comprises a detachable hook 26 adapted to engage over either of the cross bars 2, and this hook has pivoted thereto a rack bar 27. In connection with the rack bar 27, I employ a second hook 28 which is slotted at 29 to slide over the rack bar 27, and a tongue 30 is adapted to engage one of the teeth on the rack bar 27. In dotted lines, Fig. 2, the use of this hook is illustrated, and it will readily be understood that this contrivance assists in holding the articles on the hand truck.

In the dotted position A, in Fig. 2, the truck is represented as resting upon the curved nose 8 of the head, and in dotted position B, the truck is represented as resting upon the rollers 16. In the latter position, of course, the truck is supported by hand, and is being rolled over the ground to transport or transfer an article. When the truck is rocked from the roller of position B, on to the nose, as in position A, an article may be unloaded therefrom. When the truck is being rolled on its wheels it will readily be understood that by dropping the rear end the heel 9 will contact with the ground, and work as a brake. The handles 14 are especially useful when lifting the truck to vertical position in order to push the ledge 6 under the nose from the box in loading, or in withdrawing the nose from the box in unloading. The nose 8 may also be used as a brake to rest the truck against accidental movement, by turning the truck to position A, in Fig. 2.

The curved handles 22 are particularly useful when the truck is used on an uneven or irregular floor, as the hands may be slipped up or down on the curved handgrasp to adapt the hand-hold to the changed position of the truck.

One of the meritorious features of the truck is the facility with which it can be placed in vertical position against the back of a piano preparatory to pulling backward on the handles, and then the loaded truck may be rolled backward on the runners or curved heads to the wheels, or to flat position in Fig. 2, to make repairs, put in casters, etc. The weight of the article assists in loading or unloading after the truck is tilted forward or backward in moving from wheels to heads or vice versa.

Numerous other meritorious features and advantages could be pointed out, but these will all be appreciated by the operator of the truck, and when he becomes familiar with the same, will find that the device is a great labor saving contrivance, and a powerful aid in handling furniture, boxes, pianos, etc.

From the above description taken in connection with my drawings, it is apparent that I have provided a device which will enable an operator to perform laborious work with skill and despatch, and with the expenditure of only a usual exertion on his part.

What I claim is:

The combination in a hand truck with its frame of a pair of spaced quadrant shaped members each having a flat horizontal heel at the end of its curved portion, of a spindle connecting said members and rollers on the spindle journaled between said members forward of the flat heel, and a pair of supplemental rollers located at the upper end of the curved portion of said members.

In testimony whereof I affix my signature in presence of two witnesses.

CURTIS S. CALHOUN.

Witnesses:
W. J. DICKINSON,
IVAN C. BROWN.

Copies of this patent may be obtained for five cents each, by addressing the "Commissioner of Patents, Washington, D. C."